(No Model.)
E. H. JOHNSON.
PISTON ROD CONNECTION FOR STEAM ENGINES.
No. 433,986. Patented Aug. 12, 1890.
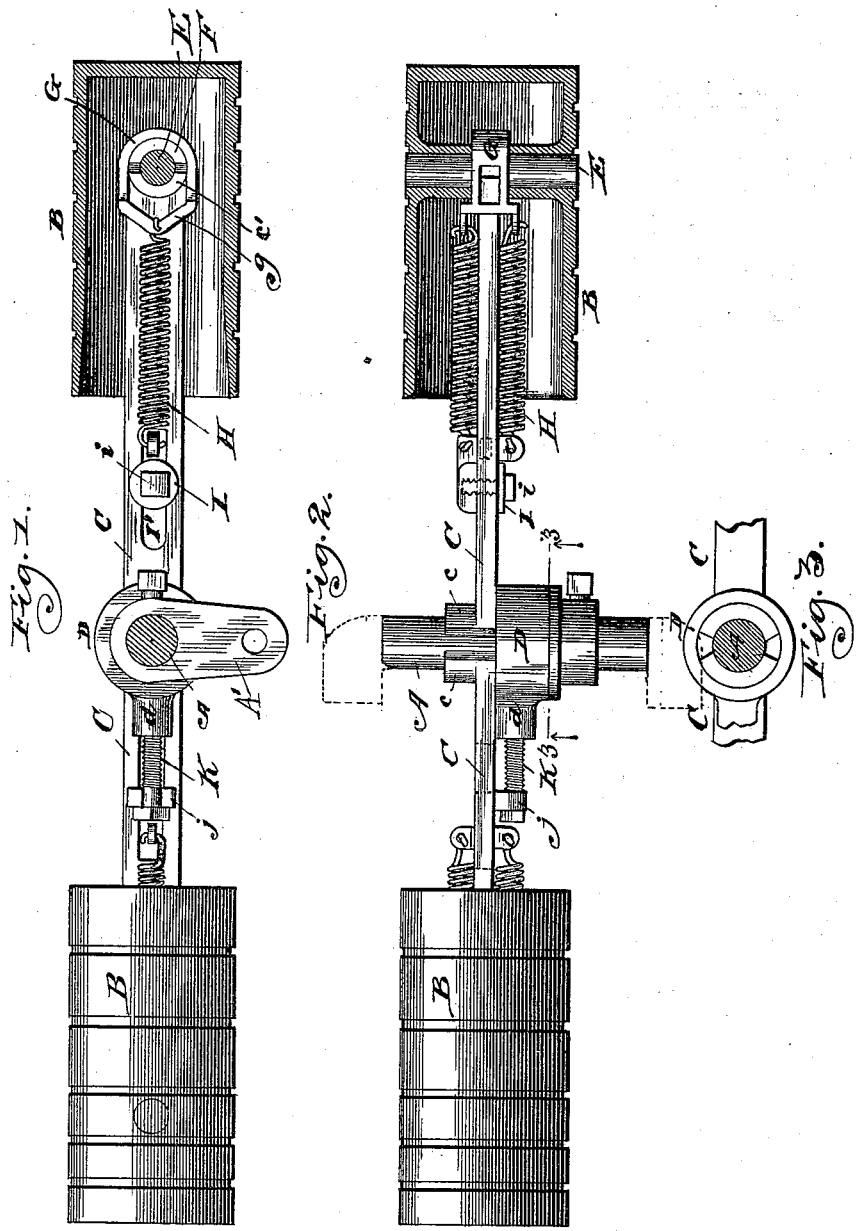
Witnesses
J. R. Andrews,
D. S. Hayes.
Inventor
Enos H. Johnson
By His Attorney
C. C. Linthicum

UNITED STATES PATENT OFFICE.

ENOS H. JOHNSON, OF CHICAGO, ILLINOIS.

PISTON-ROD CONNECTION FOR STEAM-ENGINES.

SPECIFICATION forming part of Letters Patent No. 433,986, dated August 12, 1890.

Application filed April 15, 1890. Serial No. 348,077. (No model.)

*To all whom it may concern:*

Be it known that I, ENOS H. JOHNSON, a citizen of the United States, residing at Chicago, in the county of Cook and State of Illinois, have invented certain new and useful Improvements in Piston-Rod Connections for Steam-Engines, of which the following is a specification.

The object of my invention is to secure tight bearings in the operation of engines, and the invention is particularly applicable to piston-rod bearings for multiple-cylinder steam-engines.

In carrying out my invention I employ a tension spring or springs so connected with the rods as to hold the bearings snugly to the crank and pins of the cylinders, so as to prevent any lost motion, to compensate for wear in the bearings, and to prevent any rattling of the parts. The springs themselves are not flexed by the movement of the rods, but are connected thereto, so as to exert a constant tendency (which may be regulated and adjusted) to draw the rod-bearings firmly to their seats upon the crank and pins. There is, therefore, no wear on the springs nor on their connections. In this class of engines it is common to set the valves so that the steam will not be wholly exhausted during the back-stroke of the piston, the remaining steam being compressed on the back-stroke, so as to hold the bearings to their seats on the pin and crank in order to prevent noisy action.

By the use of my invention I am enabled to exhaust entirely the steam from behind the pistons and depend upon the springs to hold the bearings to their seats. The springs are adjusted to any tension in accordance with the speed to which it is desired to adjust the engine, and this adjustment need not be made except as the bearings wear, so that the tension of the spring is relaxed.

In the drawings, Figure 1 is a side elevation, partly in section, of the pistons, rods, and crank of a multiple-cylinder engine, showing my improvements applied thereto. Fig. 2 is a plan view of the same parts; and Fig. 3 is a section through the crank and crank-bearings, with the rods in broken elevation, taken on the line 3 3 of Fig. 2, and looking in the direction indicated by the arrows.

In the drawings, A represents the crank of the driven shaft, and A' a crank-arm to which valve-rods may be connected; B B, the pistons, and C C their rods. These rods have the parti-circular bearings $c$ $c'$, the former of which are held to the crank A by means of the collar D, and the latter are fitted to the pins E within the hollows of the pistons. To take up the wear of the bearings $c'$ on the pins E, I provide a brass F, as shown, at the right of Figs. 1 and 2, which, when applied, will be of such bore as to cover less than one-half of the pin, and this brass is held to the pin by means of the yoke G, having ears $g$, to which are connected one or more tension-springs H, whose other ends are secured with sliding blocks I, secured in ways I' in the rods C. As shown, the block at the right of the Figs. 1 and 2 has the set-screw $i$, by which the tension of the spring may be adjusted, while the other block has the lug $j$, to which a screw K is applied, one end of said screw being tapped into an extension $d$ of the collar D.

Constructed as above described the parts are adjusted and operate as follows: The wear on the bearings is taken up by the springs and as the wearing progresses the tension of the spring may be readjusted by manipulating the set-screws $i$ K. As the latter is threaded into the collar D, which holds the crank-bearings in place, it is evident that the tension of the springs will also hold the ends $c$ of the rods C tightly to the crank, thus preventing lost motion and rendering the working noiseless. The pin-bearings are held from wearing under the throw of the pistons by the action of the springs, and thus cushioning the steam behind the pistons is rendered unnecessary and the working efficiency of the engine is increased.

Of course the brass F may be formed integral with the yoke G, the number of the springs increased or diminished, and their connection with the other parts changed. I do not, therefore, limit my invention to precise details of construction and arrangement of parts.

I claim—

1. In an engine having its piston-rod connections divided at the piston end, a yoke surrounding and adapted to confine the outer member of the bearing, and a spring or springs connecting said yoke with the rod, substantially as described.

2. In an engine having its piston-rod connections divided at the piston end, a tension-spring connecting the outer member of the bearing or block adjustable along the rod, and means for securing the block to the rod, substantially as described.

3. In a multiple-cylinder engine, piston-rods having parti-circular bearings at their inner ends confined by means of a collar upon a crank-shaft, and similar bearings at their outer ends upon pins secured to the pistons, outer bearings or brasses for said pins connected to the rods by tension-springs, and a connection between said collar and one of said springs, substantially as described.

ENOS H. JOHNSON.

Witnesses:
FREDERICK C. GOODWIN,
C. C. LINTHICUM.